United States Patent
Hayashi et al.

(10) Patent No.: US 6,622,553 B2
(45) Date of Patent: Sep. 23, 2003

(54) AIR PRESSURE WARNING DEVICE OF VEHICLE TIRE

(75) Inventors: Toshio Hayashi, Hiroshima-ken (JP); Fumitaka Andou, Hiroshima-ken (JP); Kazufumi Adachi, Hiroshima-ken (JP); Kiyoshi Sakamoto, Chiba-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/309,327

(22) Filed: Dec. 4, 2002

(65) Prior Publication Data

US 2003/0126920 A1 Jul. 10, 2003

(30) Foreign Application Priority Data

Dec. 4, 2001 (JP) .......................... 2001-369815

(51) Int. Cl.⁷ ............................................. G01M 17/02
(52) U.S. Cl. ........................................................ 73/146
(58) Field of Search ................... 73/146, 146.4, 73/146.5; 340/442–447; 152/415, 416, 417, 450, 331.1

(56) References Cited

U.S. PATENT DOCUMENTS 5,629,873 A    5/1997   Mittal et al. ................. 152/415

FOREIGN PATENT DOCUMENTS

EP    1 184 208       3/2002
JP    2001-033259     2/2001

*Primary Examiner*—William Oen

(57) ABSTRACT

An air pressure warning device of a vehicle tire has an excessive/deficient amount calculation module (10b) for calculating an excessive/deficient amount on the basis of the difference between a normal air pressure stored in a normal air pressure storage module (10a) and a detected tire air pressure, an informing control module (10c) for controlling an informing module (11) to inform an excessive/deficient state of the tire air pressure determined based on the calculated excessive/deficient amount, and a normal air pressure correction module 10e for increasing the readout normal air pressure by a predetermined value when an expressway traveling detection module (10d) detects that the vehicle is on an expressway.

12 Claims, 9 Drawing Sheets

TIRE AIR PRESSURE CONDITION

- NORMAL AIR PRESSURE 275 KPa
- MEASURED AIR PRESSURE 245 KPa
- EXCESSIVE/DEFICIENT AMOUNT −30 KPa

AIR PRESSURE WARNING DEVICE OF VEHICLE TIRE

FIELD OF THE INVENTION

The present invention relates to an air pressure warning device of a vehicle tire and, more particularly, to an air pressure warning device which can prompt a user to appropriately adjust the tire air pressure during or before traveling on an expressway.

BACKGROUND OF THE INVENTION

Conventionally, a technique for detecting the air pressure of a vehicle tire, and informing the user of the detected (measured) air pressure as a tire air pressure state is known.

As such technique, for example, Japanese Patent Laid-Open No. 2001-33259 discloses that when a tire pressure drop is detected in a vehicle, information indicating the tire pressure drop and a travel route to a gas station are displayed on the screen of a navigation device.

According to this prior art, when the tire air pressure has dropped, since the travel route to a gas station where the air pressure can be adjusted is displayed on the navigation screen, a driver (passenger) can quickly adjust the air pressure.

When a vehicle runs on an expressway, it is preferable for safety to increase the tire air pressure of that vehicle by a predetermined value compared to a case wherein the vehicle runs on open roads.

However, even when the user has such knowledge, he or she does not always practice it every time the vehicle runs on an expressway, i.e., the tire air pressure is not always appropriately adjusted every time the vehicle runs on an expressway.

SUMMARY OF THE INVENTION

The present invention has been proposed to solve the conventional problems, and has as its object to provide an air pressure warning device of a vehicle tire, which positively displays an excessive/deficient state of the tire air pressure during or before traveling on an expressway so as to arouse user's awareness of tire air pressure adjustment and to promote appropriate tire air pressure adjustment.

In order to achieve the above object, the present invention adopts the following solution.

That is, in order to achieve the above object, the first arrangement of the present invention is an air pressure warning device (10) of a vehicle tire, which comprises tire air pressure detection means (6–9), attached to a vehicle tire, for detecting a tire air pressure, and informing means (11) for informing a tire air pressure state on the basis of the tire air pressure detected by the tire air pressure detection means, characterized by comprising:

storage means (10a) for storing a normal air pressure of the tire;

calculation means (10b) for calculating an excessive/deficient amount of a measured air pressure of the tire from the normal air pressure on the basis of a relationship between the normal air pressure stored in the storage means and the air pressure detected by the tire air pressure detection means;

expressway traveling detection means (10d) for detecting if the vehicle is traveling on an expressway or if the vehicle will travel on the expressway before the beginning of actual traveling; and informing control means for controlling the informing means to inform the excessive/deficient amount calculated by the calculation means as an air pressure state of the tire, and in that the informing control means (10c) controls the informing means to inform a deficient amount larger than an actual amount upon informing the deficient amount of the measured air pressure of the tire from the normal air pressure, by correcting to increase the normal air pressure read out from the storage means by a predetermined value, and setting the corrected normal air pressure in the calculation means, when the expressway traveling detection means detects that the vehicle is traveling on the expressway, or detects possibility of traveling on the expressway before the beginning of actual traveling.

According to the first arrangement of the present invention, since the normal air pressure is set to be higher by the predetermined value during or before traveling on the expressway of the vehicle, even when the tire air pressure is not deficient with respect to the normal air pressure under ordinary circumstances, the calculation means calculates a deficient amount in the state wherein the normal air pressure has been corrected to a relatively higher value, and the informing means informs that deficient state.

When the user recognizes information of the deficient state, he or she becomes aware of the need for pumping air in a tire. For example, the user replenishes air in a tire at a gas station in a service area during traveling on the expressway, or at a gas station along an open road before heading toward an expressway ramp.

That is, according to the present invention, since the deficient state of the tire air pressure is positively displayed during or before traveling on the expressway, user's awareness of air pressure adjustment can be aroused, thus promoting appropriate tire air pressure adjustment.

In the second arrangement of the present invention, the expressway traveling detection means (10d) detects, on the basis of a communication for expressway toll collection between a communication unit (12) mounted on the vehicle and a unit (13) equipped on the road side, if the vehicle is traveling on the expressway.

According to the second arrangement of the present invention, the state before the beginning of traveling on the expressway can be recognized using an onboard unit used in a so-called electronic toll collection system.

In the third arrangement of the present invention, the expressway traveling detection means (10d) comprises navigation means (14) which includes current position detection means (14a) for detecting a current position of the vehicle, and travel route setting means (14b) for setting a travel route of the vehicle to a destination, and the expressway traveling detection means detects that the vehicle is traveling on the expressway or predicts that the vehicle will travel on the expressway, when the current position of the vehicle detected by the current position detection means indicates that the vehicle is present on the expressway, or when the travel route set by the travel route setting means includes the expressway.

According to the third arrangement of the present invention, the expressway traveling state or the state before the beginning of traveling on the expressway can be recognized using navigation means.

In the fourth arrangement of the present invention, the navigation means (14) includes display means (14d) for displaying the current position of the vehicle detected by the current position detection means (14a) and the travel route to the destination set by the travel route setting means (14*b*) together with a map image, and when the calculation means calculates the excessive/deficient amount of the tire air pressure, the informing control means controls the navigation means to display information associated with a facility where the tire air pressure can be adjusted on a travel route from the current position of the vehicle to an approach ramp of the expressway.

According to the fourth arrangement of the present invention, when the excessive/deficient state of the tire air pressure is detected, since the facility that allows to adjust the tire air pressure is displayed on the travel route from the current position of the vehicle to an approach ramp to the expressway, the driver can easily acquire information associated with the facility that allows to adjust the tire air pressure before the beginning of traveling on the expressway.

In the fifth arrangement of the present invention, when the display means displays the information associated with the facility where the tire air pressure can be adjusted, the navigation means (14) can guide the travel route to the destination by way of that facility.

According to the fifth arrangement of the present invention, since the travel route is guided by way of the facility that allows to adjust the tire air pressure, the driver can easily reach the facility that allows to adjust the tire air pressure.

In the sixth arrangement of the present invention, when the calculation means calculates the excessive/deficient amount of the tire air pressure, the navigation means (14) can guide a travel route that excludes the expressway detected by the expressway travelling detection means as the travel route from the current position of the vehicle to the destination.

According to the sixth arrangement of the present invention, when the excessive/deficient state of the tire air pressure is detected, since a travel route that detours around the expressway is guided, the travel route to the destination without using the expressway can be presented to the user, e.g., when there is no facility that allows to adjust the tire air pressure from the current vehicle position to an approach ramp of the expressway.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
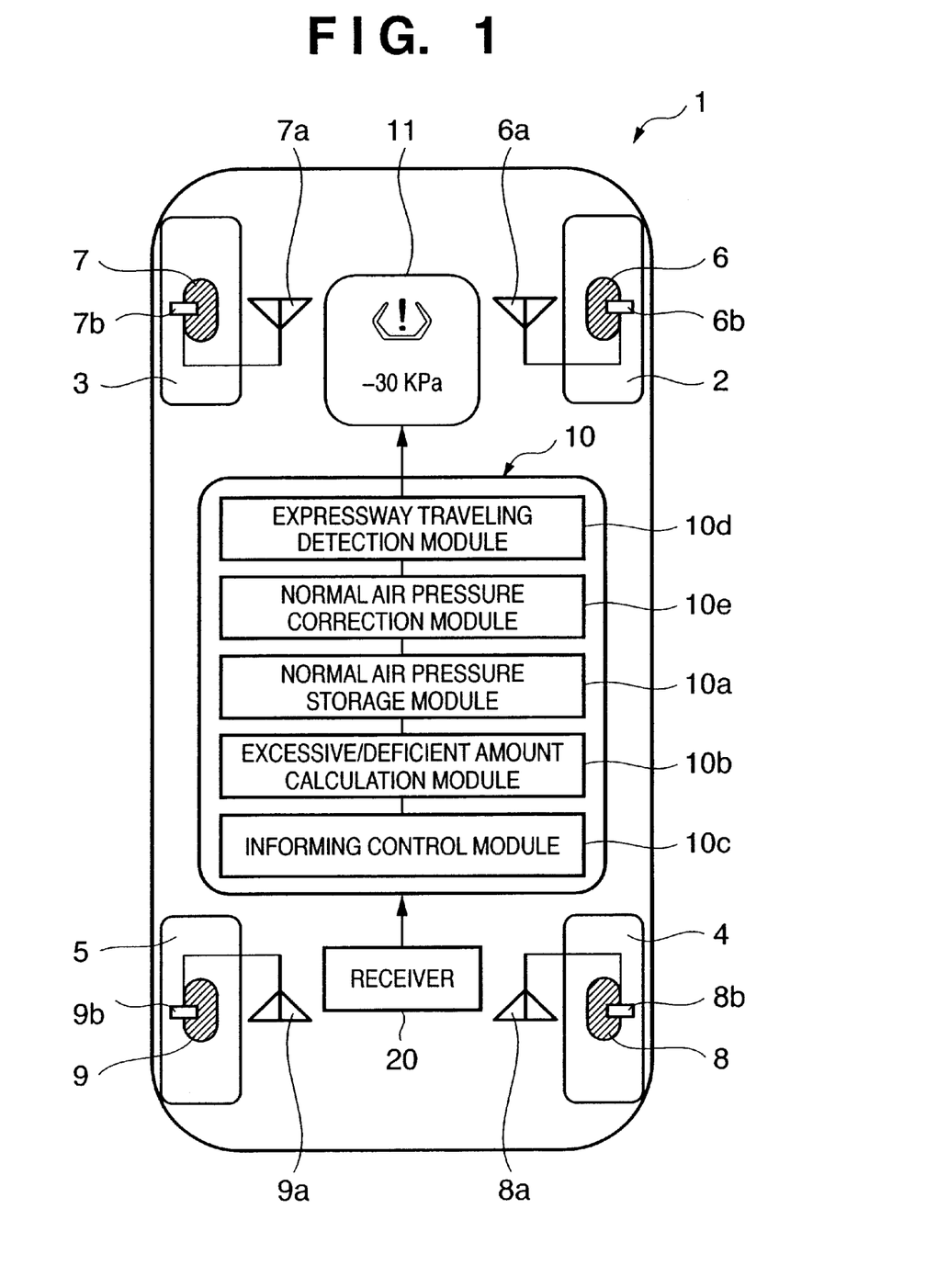
FIG. 1 is a view showing an example of the overall arrangement of an air pressure warning device of a vehicle tire according to the first to third embodiments.

FIG. 1 shows the overall arrangement according to the first to third embodiments. Referring to FIG. 1, a vehicle 1 has tires 2 to 5, which respectively comprise air pressure sensors 6 to 9. The air pressure sensors 6 to 9 can detect not only an air pressure but also a tire temperature.

The air pressure sensors 6 to 9 respectively form sensor units which comprise transmitters 6*b* to 9*b* and antennas 6*a* to 9*a*, and the air pressure (to be referred to a measured air pressure hereinafter) and tire temperature detected by the air pressure sensors are output to a control unit 10 for informing the tire pressure state via wireless communications.

In this embodiment, the antenna is equipped in correspondence with each air pressure sensor, but data of the respective air pressure sensors may be sent using only one antenna.

The control unit 10 implements functions of respective modules to be described below by executing operation instructions of a software program, which is prepared in advance to display air pressure information of a vehicle tire, using a CPU (central processing unit; not shown).

Note that the modules are predetermined function units implemented by the software program and hardware, and the control unit 10 shown in FIG. 1 is comprised of:

a normal air pressure storage module 10*a* that stores a normal air pressure corresponding to a tire temperature;

an excessive/deficient amount calculation module 10*b* for calculating the excessive/deficient amount of an air pressure on the basis of the difference between the measured air pressure detected by the air pressure sensors 6 to 9, and the corresponding normal air pressure stored in the normal air pressure storage module 10*a*;

an information control module 10*c* for outputting the excessive/deficient amount calculated by the excessive/deficient amount calculation module 10*b* to an informing module (display and/or loudspeaker) 11 to inform the user of it;

an expressway traveling detection module 10*d* for detecting if the vehicle 1 is running on an expressway; and a normal air pressure correction module 10*e* for, when the expressway traveling detection module 10*d* detects an expressway traveling state or a state before the beginning of traveling on the expressway, correcting the normal air pressure stored in the normal air pressure storage module 10*a* to be higher by a predetermined value (increasing the air pressure).

In this embodiment, "expressway traveling state" indicates a state (situation) wherein the vehicle 1 is traveling on the expressway, and "state before the beginning of traveling on an expressway" indicates a state (situation) before the vehicle 1 begins to actually travel on the expressway (the same applies to the following description).

Also, a receiver 20 which receives radio signals sent from the antennas 6a to 9a of the air pressure sensors 6 to 9 and demodulates them to information in a format that the control unit 10 can read is connected to the control unit 10.

Figure 2:
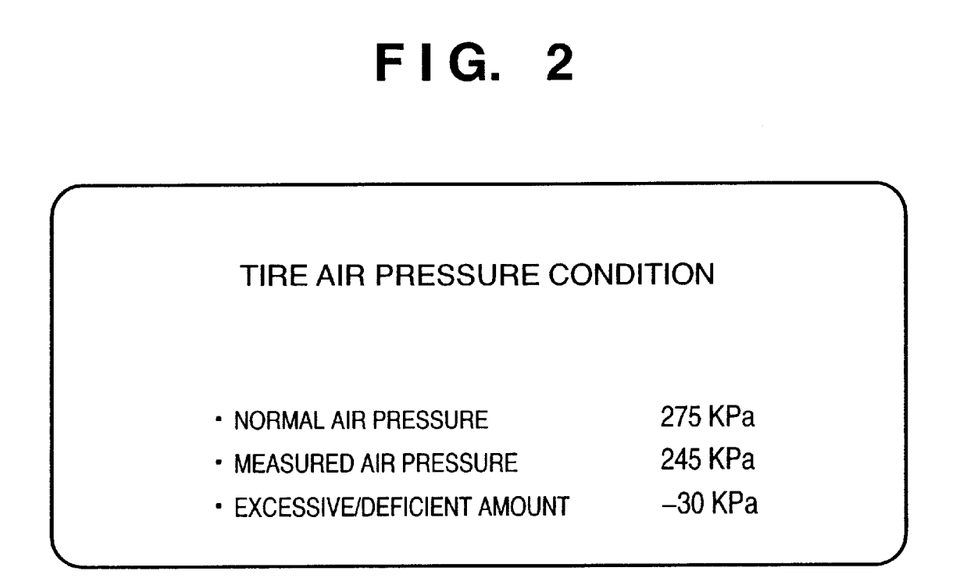
FIG. 2 shows a display example according to the first embodiment.

Note that the informing module 11 may use, e.g., a display screen of a navigation system, or may have a dedicated display on an instrument panel so as to display information. The informing module 11 displays a normal air pressure (e.g., 275 KPa), measured air pressure (e.g., 245 KPa), and excessive/deficient amount (e.g., −30 KPa) of the tire pressure, as shown in, e.g., FIG. 2.

The control unit 10 may adopt, e.g., a control unit of a car navigation system.

First Embodiment

Figure 3:
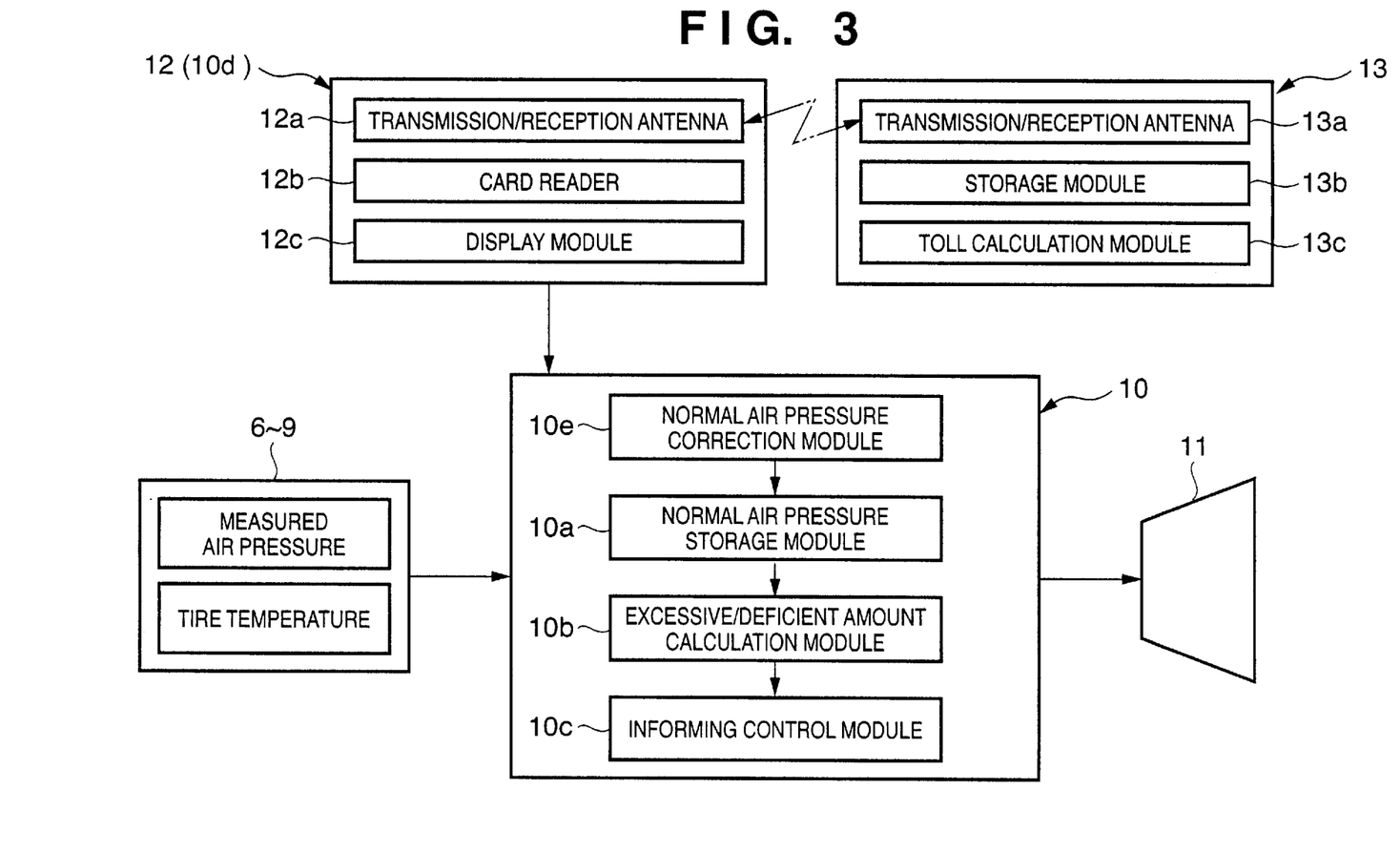
FIG. 3 is a control block diagram of an air pressure warning device of a vehicle tire according to the first embodiment.

FIG. 3 is a control block diagram according to the first embodiment, and shows an example wherein an onboard unit 12 in an electronic toll collection (to be simply abbreviated as ETC hereinafter) system is commonly used as the expressway traveling detection module 10d.

More specifically, the air pressure and tire temperature are detected by the air pressure sensors 6 to 9, and the measured air pressure and tire temperature are sent to the control unit 10 used to inform the tire air pressure state via the antennas 6a to 9a of the sensors 6 to 9.

In the control unit 10, a normal air pressure (e.g., 275 KPa) corresponding to the current tire temperature detected by the air pressure sensors 6 to 9 is read out from the normal air pressure storage module 10a. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a.

The measured air pressure detected by the air pressure sensors 6 to 9, the normal air pressure read out from the normal air pressure storage module 10a, and the excessive/ deficient amount calculated by the excessive/deficient amount calculation module 10b are supplied to the informing control module 10c, which controls the informing module 11 to inform the measured air pressure (245 KPa), normal air pressure (275 KPa), and excessive/deficient amount (−30 KPa).

The control unit 10 includes the normal air pressure correction module 10e, which corrects the normal air pressure read out from the normal air pressure storage module 10a to be higher by a predetermined value a when it is detected based on expressway traveling information from the onboard unit 12 of the ETC system (to be described later), which also serves as the expressway traveling detection module 10d, that the vehicle 1 is driving on the expressway.

The ETC system will be described below. The ETC system is comprised of the onboard unit 12 which is equipped in the vehicle, and roadside units 13 which are respectively equipped at approach and exit ramps of the expressway.

The onboard unit 12 comprises a transmission/reception antenna 12a for transmitting/receiving information to/from the roadside units 13, a card reader 12b for detachably loading an IC card, and reading information of that IC card, and a display module 12c for visibly displaying an expressway toll or the like on a display (not shown).

Each roadside unit 13 comprises a transmission/reception antenna 13a for transmitting/receiving information to/from the antenna 12a of the onboard unit 12, a storage module 13b that stores customer data, and a toll calculation module 13c for calculating an expressway toll.

In such ETC system, when a vehicle passes by an approach ramp of an expressway, information is exchanged between the onboard unit 12 and roadside unit 13 on the approach ramp side so as to recognize the beginning of traveling of that vehicle on the expressway. Also, when the vehicle passes by an exit ramp of the expressway, information is exchanged between the onboard unit 12 and roadside unit 13 on the exit ramp side so as to calculate an expressway toll of that vehicle, and to collect the toll from the bank account of the IC card holder. In this way, the ETC system can achieve non-stop passage of vehicles at toll gates, alleviation of traffic jam, and cashless payment.

The detailed control contents of the control unit 10 according to the first embodiment will be described below with reference to the flow chart of FIG. 4.

Figure 4:
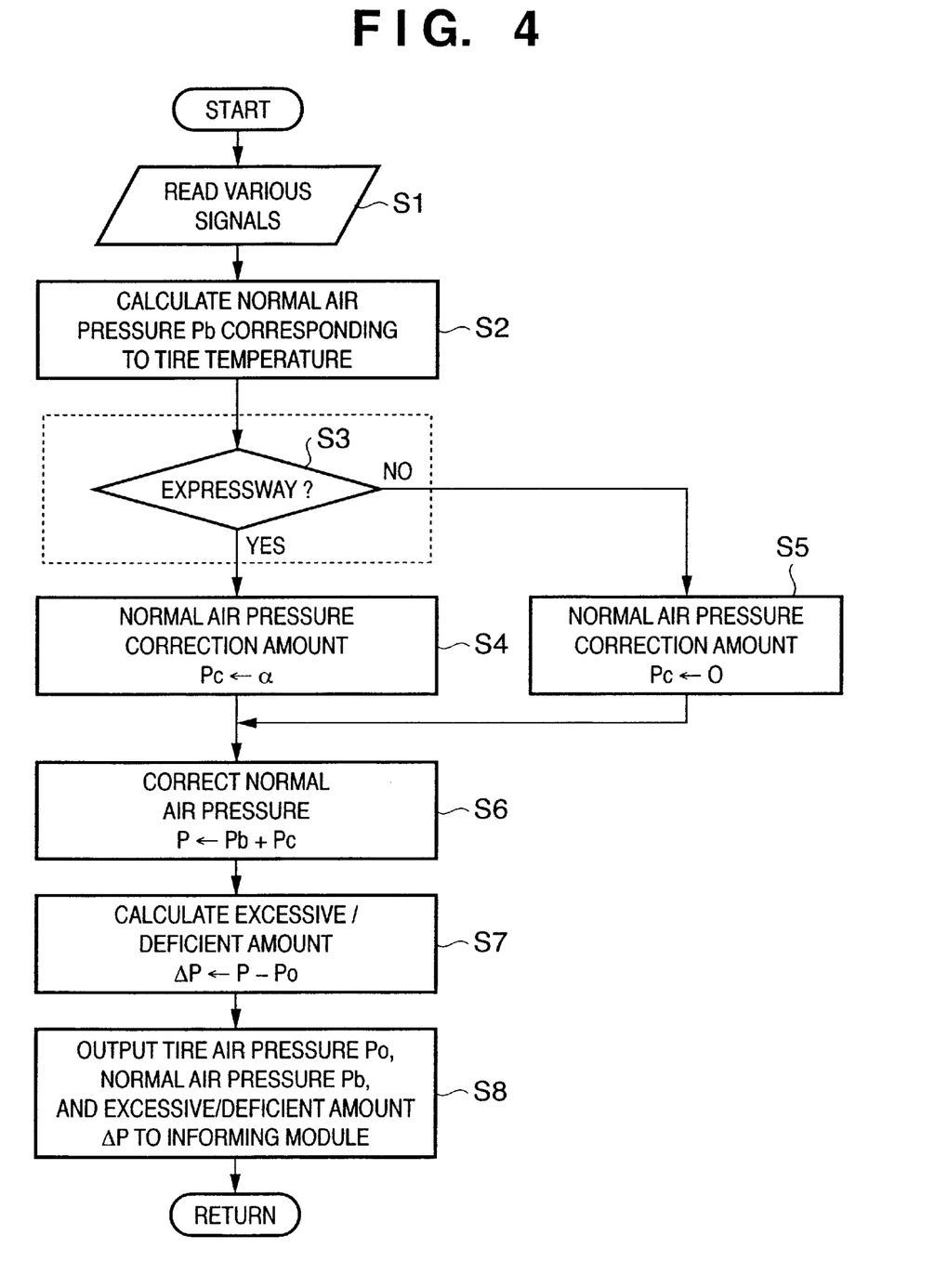
FIG. 4 is a flow chart showing the control contents of a control unit 10 according to the first embodiment.

In step S1 in FIG. 4, various signals such as a tire air pressure Po and tire temperature T detected by the air pressure sensors 6 to 9, expressway information from the onboard unit 12, and the like are read.

In step S2, a normal air pressure Pb corresponding to the current tire temperature T is calculated on the basis of a map that pre-stores normal air pressures Pb corresponding to tire temperatures T. In this map, the normal air pressure Pb is set to increase the air pressure in proportion to the tire temperature rise.

It is checked in step S3 if the information read from the onboard unit 12 indicates traveling on the expressway. If YES in step S3, a normal air pressure correction amount Pc used to increase the normal air pressure Pb is set to be a predetermined value α in step S4; if NO in step S3, the normal air pressure correction amount Pc is set to be zero in step S5.

In step S6, a final normal air pressure (that is, a normal air pressure that the passenger of the vehicle 1 traveling on the expressway is to be currently informed of) P is set on the basis of the normal air pressure Pb calculated in step S2 and the normal air pressure correction amount Pc set in step S4 or S5.

In step S7, an excessive/deficient amount ΔP is calculated on the basis of the difference between the final normal air pressure P set in step S6, and the actual tire air pressure Po read in step S1. In step S8, the informing module 11 informs (displays and/or audibly outputs) the tire air pressure Po read instep S1, the normal air pressure Pb calculated in step S2, and the excessive/deficient amount ΔP calculated in step S7.

As described above, according to the first embodiment, when the ETC onboard unit 12 detects traveling of the vehicle 1 on the expressway, the normal air pressure Pb is corrected to be the predetermined value α higher. Hence, since the informing module 11 informs the deficient amount, which is larger than an actual amount, of the measured air pressure of a tire from the normal air pressure Pc, it can positively inform the user of the excessive/deficient amount ΔP of the tire air pressure, thus arousing user's awareness of the need for tire air pressure adjustment and promoting appropriate tire air pressure adjustment.

Since the ETC onboard unit 12 is commonly used as the expressway traveling detection module 10d, the expressway traveling detection module 10d need not be added to a vehicle which already has had an ETC onboard unit 12.

Second Embodiment

Figure 5:
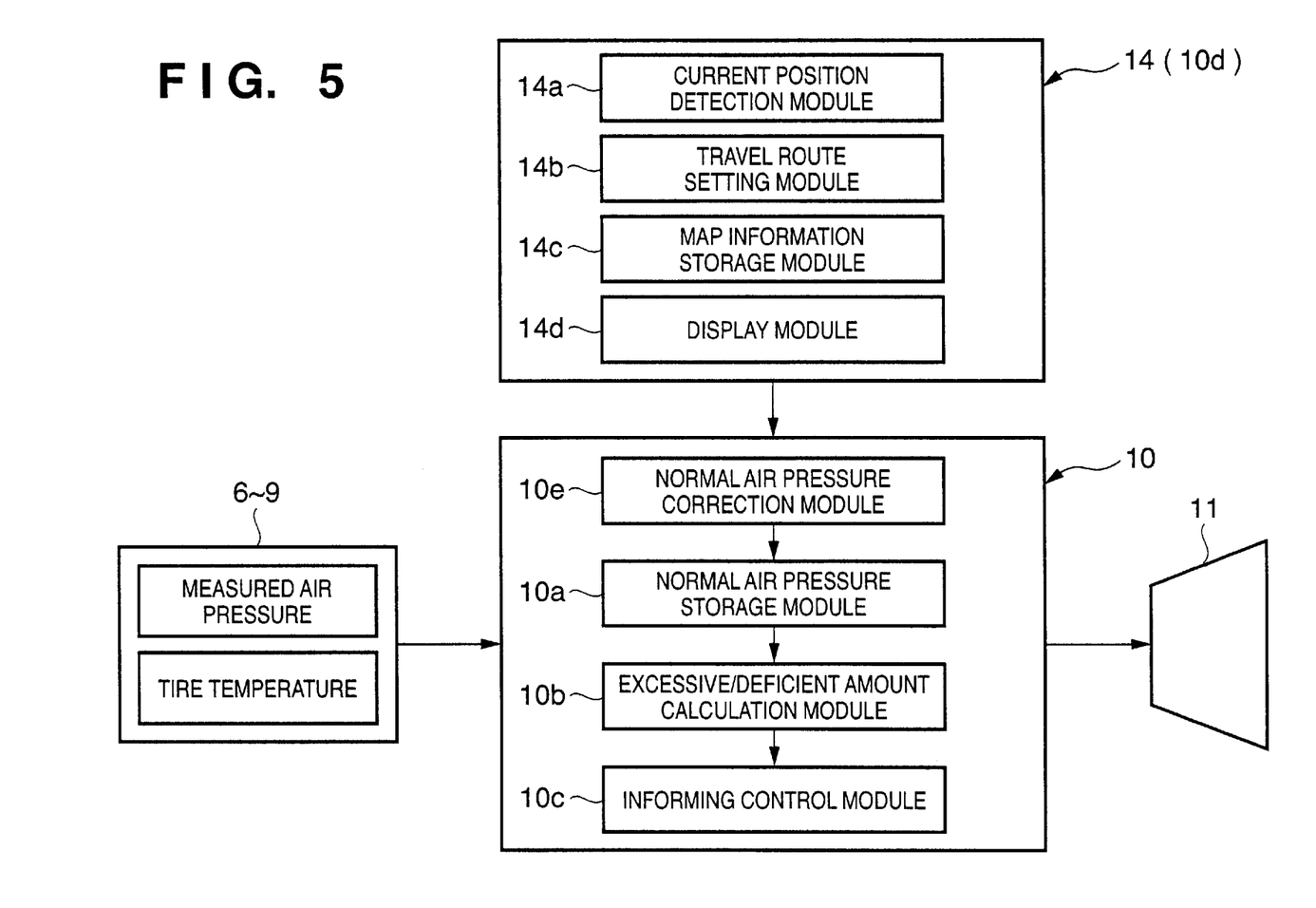
FIG. 5 is a control block diagram of an air pressure warning device of a vehicle tire according to the second embodiment.

FIG. 5 is a control block diagram according to the second embodiment, and shows an example wherein a navigation module 14 is commonly used as the expressway traveling detection module 10d.

More specifically, the air pressure and tire temperature are detected by the air pressure sensors 6 to 9, and the measured air pressure and tire temperature are sent to the control unit 10 used to inform the tire air pressure state via the antennas 6a to 9a of the sensors 6 to 9.

In the control unit 10, a normal air pressure (e.g., 275 KPa) corresponding to the current tire temperature detected by the air pressure sensors 6 to 9 is read out from the normal air pressure storage module 10a. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a.

The measured air pressure detected by the air pressure sensors 6 to 9, the normal air pressure read out from the normal air pressure storage module 10a, and the excessive/deficient amount calculated by the excessive/deficient amount calculation module 10b are supplied to the informing control module 10c, which controls the informing module 11 to inform the measured air pressure (245 KPa), normal air pressure (275 KPa), and excessive/deficient amount (−30 KPa).

The control unit 10 includes the normal air pressure correction module 10e, which corrects the normal air pressure read out from the normal air pressure storage module 10a to be higher by a predetermined value a on the basis of expressway information from a navigation control unit 14 (to be described later) which also serves as the expressway traveling detection module 10d.

The control unit 14 for navigation control will be explained below.

The control unit 14 comprises:
 a current position detection module 14a which comprises a GPS (Global Positioning System) antenna and the like for receiving a radio wave from a GPS satellite, and detects the current position of the vehicle 1;
 a travel route setting module 14b for setting a travel route (guide route) from the current position of the vehicle 1 to a destination on the basis of the destination set by the user;
 a map information storage module 14c for storing map information; and
 a display module 14d for displaying the travel route set by the travel route setting module 14b on a display (not shown) together with a map window based on the map information stored in the map information storage module 14c.

Figure 6:
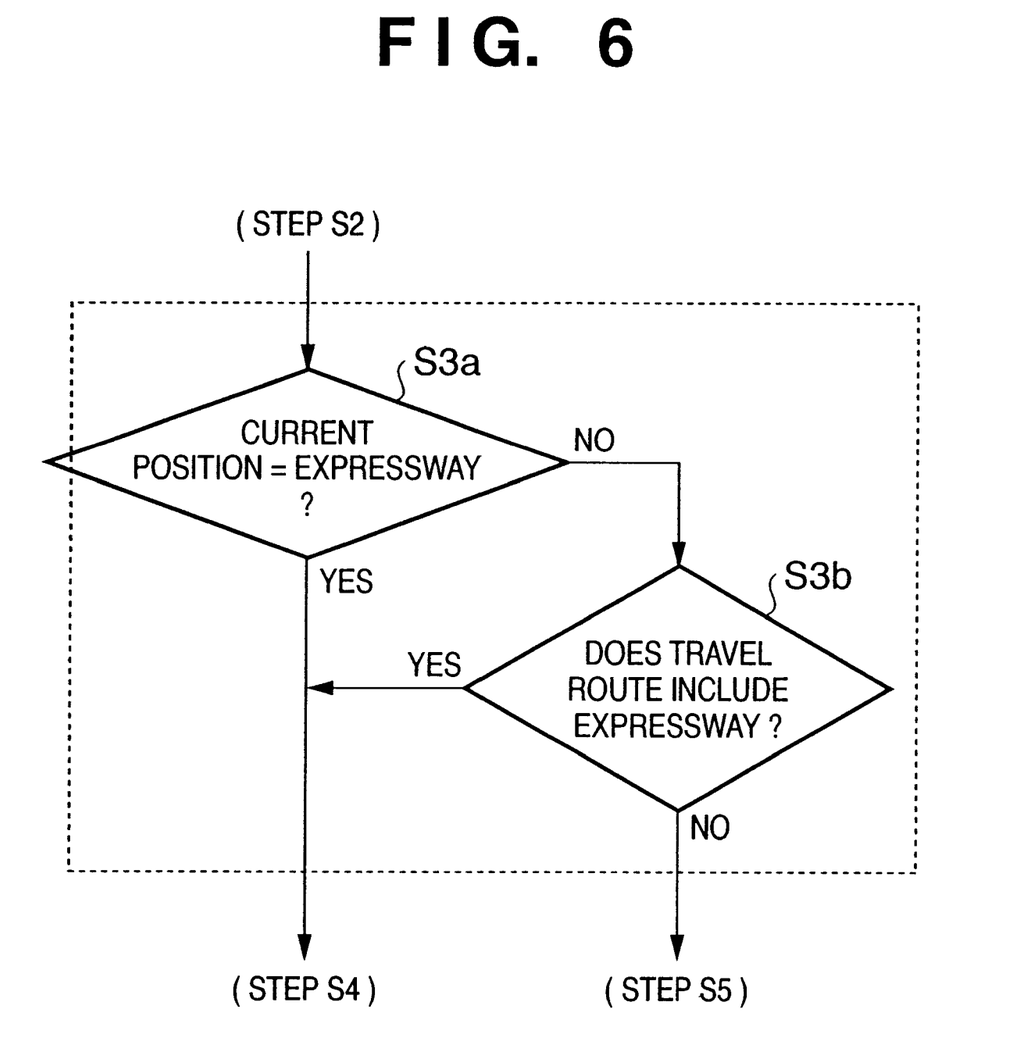
FIG. 6 is a flow chart showing the control contents of a control unit 10 according to the second embodiment, except for the same steps as in the flow chart (FIG. 4) of the first embodiment.

FIG. 6 is a flow chart showing the control contents of the control unit 10 according to the second embodiment, except for the same steps as in the flow chart (FIG. 4) of the first embodiment.

The detailed control contents of the control unit 10 according to the second embodiment are basically the same as those in the first embodiment shown in FIG. 4, except that an expressway traveling determination process in step S3 bounded by the broken line in FIG. 4 is done using information from the current position detection module 14a or travel route setting module 14b in place of information from the ETC onboard unit 12. Hence, only the difference will be described below with reference to the flow chart in FIG. 6.

It is checked in step S3a in FIG. 6 if the current position of the vehicle detected by the current position detection module 14a is on an expressway. If YES in step S3a, since the expressway traveling state is detected, the flow advances to step S4 to increase the tire air pressure Pb by the predetermined value α.

If NO in step S3a, the flow advances to step S3b to check if the travel route set by the travel route setting module 14b includes an expressway. If YES in step S3b, since the state before traveling on the expressway is detected, the flow advances to step S4 to increase the normal air pressure Pb by the predetermined value α.

If NO in both steps S3a and S3b, since neither the expressway traveling state nor the state before traveling on the expressway are detected, and no correction for increasing the tire air pressure Pb is required, the flow advances to step S5.

As described above, according to the second embodiment, when the navigation control unit 14 detects the expressway traveling state, the normal air pressure Pb is corrected to be the predetermined value α higher. Hence, since the informing module 11 informs the deficient amount, which is larger than an actual amount, of the measured air pressure of a tire from the normal air pressure Pc, it can positively inform the user of the excessive/deficient amount ΔP of the tire air pressure, thus arousing user's awareness of tire air pressure adjustment and promoting appropriate tire air pressure adjustment.

Since the navigation control unit 14 is used as the expressway traveling detection module 10d, the expressway traveling detection module 10d need not be added to a vehicle which already has had a navigation system.

When the travel route set by the travel route setting module 14b includes an expressway, since it is expected that the vehicle 1 will drive on that expressway, the normal air pressure Pb is corrected to be the predetermined value a higher in accordance with the flow chart shown in FIG. 6 (including the flow chart of FIG. 4 as a common part), and the excessive/deficient amount ΔP is displayed based on the corrected value, thus promoting appropriate tire air pressure adjustment before traveling on the expressway.

Third Embodiment

Figure 7:
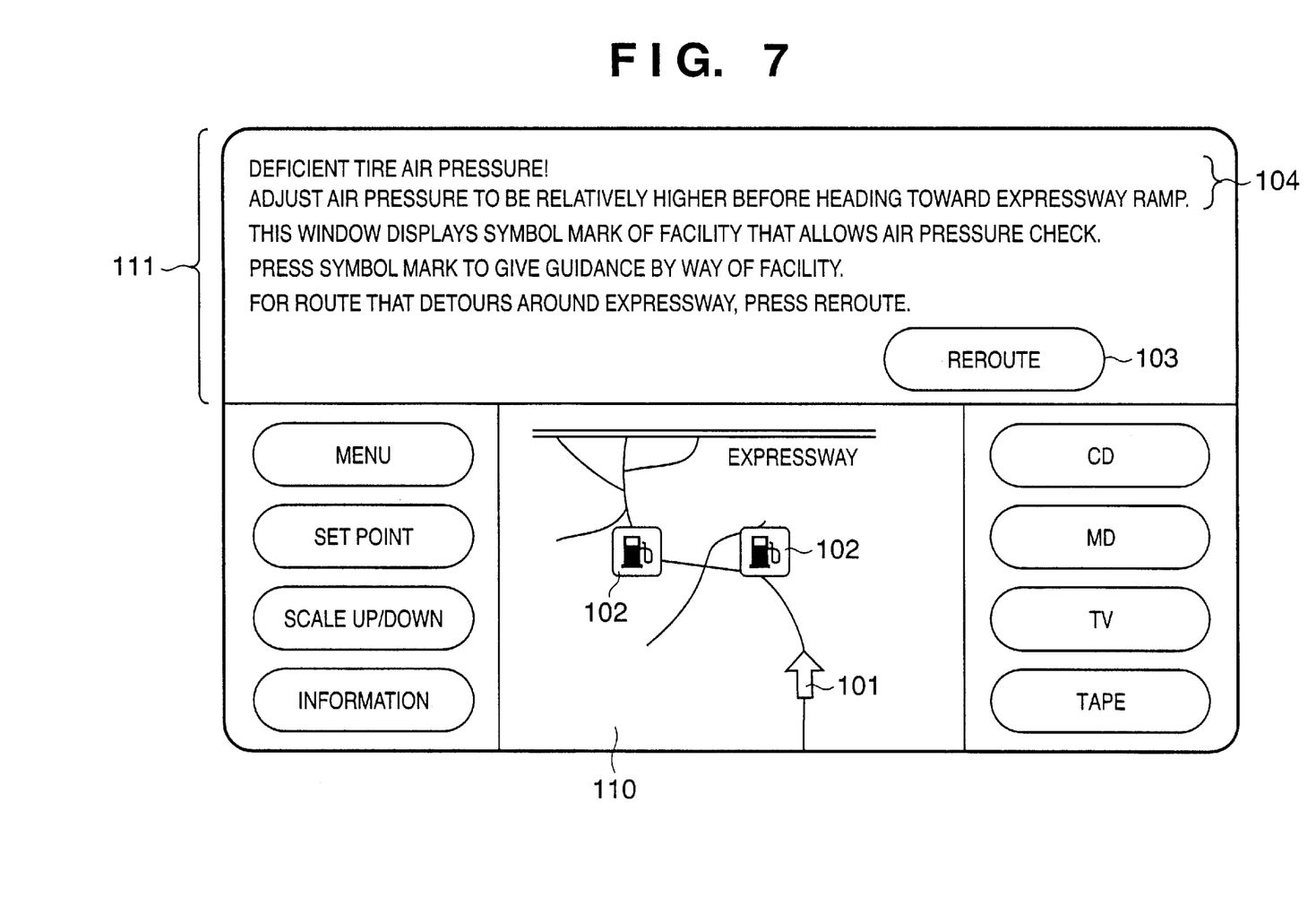
FIG. 7 shows a display example according to the third embodiment.
Figure 8:
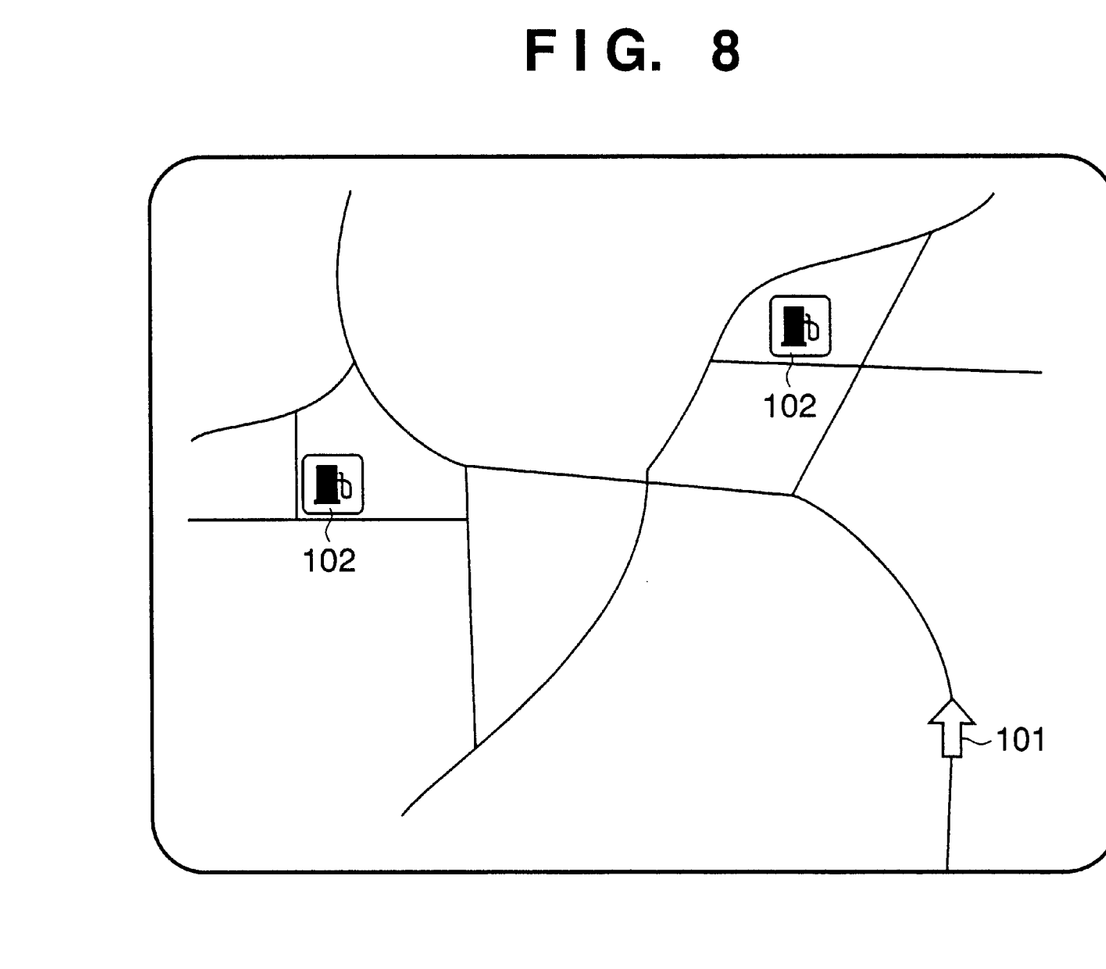
FIG. 8 shows a display example according to the third embodiment.
Figure 9:
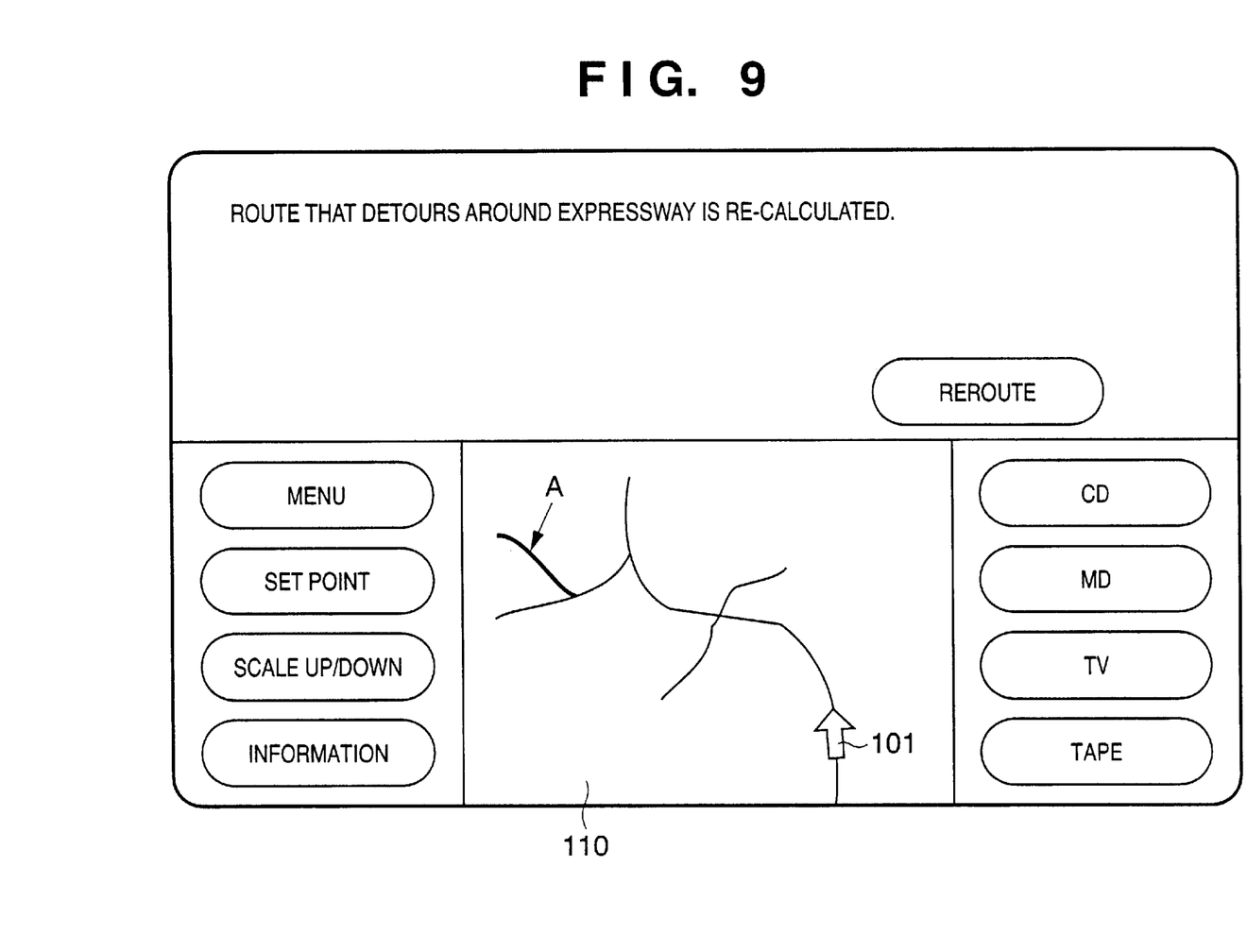
FIG. 9 shows a display example according to the third embodiment.

FIGS. 7 to 9 show display examples of the display module 14d in the navigation control unit 14 according to the third embodiment. Upon detection of a deficient tire air pressure, the display module 14d displays the location of a facility where the tire air pressure can be adjusted (in FIGS. 7 and 8, a symbol 102 indicating a gas station), so that the passenger (user) such as a driver or the like can recognize it, and displays the current position of the vehicle 1 using an arrow symbol 101.

When the facility where the tire air pressure can be adjusted is displayed, the travel route setting module 14b can set the current travel route by way of the facility where the tire air pressure can be adjusted, and can guide a route to that facility. Also, the module 14b can re-set a travel route that detours around the expressway. Such processes will be described in detail below.

In FIG. 7, in the navigation control unit 14, when the informing control module 10c informs the excessive/ deficient state of the tire air pressure, the display module 14d displays the symbol 101 indicating the current position of the self vehicle, the symbol mark (gas station in FIG. 7) 102 indicating the facility where the tire air pressure can be adjusted, and the current travel route by way of the facility on a display area 110. Also, the module 14d displays, on a display area 111, a message 104 indicating the deficient state of the tire air pressure, and a reroute switch 103 that allows to re-calculate a travel route without using any expressway.

When the user operates the symbol mark 102 indicating the facility where the tire air pressure can be adjusted on the display area 102 on the display screen, the control unit 14 can set the current travel route by way of that facility, and can guide the travel route to that facility. For example, as shown in FIG. 8, a detailed travel route from the current position (101) of the vehicle 1 to the facility is displayed in an enlarged scale. In this manner, the user can easily reach the facility (102) where the tire air pressure can be adjusted.

When the user wants to set a travel route that detours around the expressway while the excessive/deficient state of the air pressure is displayed, as shown in FIG. 7, the control unit 14 executes a travel route calculation process upon operation of the reroute switch 103, and a new route without using any expressway is set on the display area 110, as shown in, e.g., FIG. 9. (In the display example in FIG. 9, the expressway included in the display example in FIG. 7 disappears, and a new route A appears.)

As described above, according to the third embodiment, when an excessive/deficient state of the tire air pressure is detected, the facility (102) where the tire air pressure can be adjusted is displayed, and a guidance of a travel route to that facility where the tire air pressure can be adjusted is displayed can be given. For this reason, the user can easily reach the facility where the tire air pressure can be adjusted, and can surely adjust the tire air pressure.

Also, a travel route to the destination without using the expressway can be provided to the user, e.g., when no facility where the tire air pressure can be adjusted is available near the route from the current vehicle position to an approach ramp of the expressway.

In this embodiment, practical numerical values of the excessive/deficient amount, normal air pressure, and measured air pressure are displayed as the deficient state of the tire air pressure. Alternatively, the excessive/deficient state may be simply informed by a warning lamp, buzzer, or the like without displaying these numerical values.

In the third embodiment, as a guide method to the facility where the tire air pressure can be adjusted upon receiving information of an excessive/deficient state of the tire air pressure, a detailed travel route from the current position of the vehicle to that facility is displayed in an enlarged scale. Alternatively, a voice guidance of a travel route may be given without changing the display screen contents.

In the third embodiment, a gas station is displayed as the facility where the tire air pressure can be adjusted. In addition, locations where tire air pressure adjustment pumps are equipped such as a car dealer, car shop, and the like may be displayed.

As described above, according to the aforementioned embodiments, a deficient state of the tire air pressure is positively displayed during or before traveling on an expressway, thereby arousing user's awareness of tire air pressure adjustment and promoting appropriate tire air pressure adjustment.

As many apparently widely different embodiments of the present invention can be made without departing from the spirit and scope thereof, it is to be understood that the invention is not limited to the specific embodiments thereof except as defined in the claims.

What is claimed is:

1. An air pressure warning device of a vehicle tire, which comprises tire air pressure detection means, attached to a vehicle tire, for detecting a tire air pressure, and informing means for informing a tire air pressure state on the basis of the tire air pressure detected by the tire air pressure detection means, comprising:

storage means for storing a normal air pressure of the tire;

calculation means for calculating an excessive/deficient amount of a measured air pressure of the tire from the normal air pressure on the basis of a relationship between the normal air pressure stored in said storage means and the air pressure detected by the tire air pressure detection means;

expressway traveling detection means for detecting if the vehicle is traveling on an expressway or if the vehicle will travel on the expressway before the beginning of actual traveling; and informing control means for controlling the informing means to inform the excessive/deficient amount calculated by said calculation means as an air pressure state of the tire, wherein said informing control means controls the informing means to inform a deficient amount larger than an actual amount upon informing the deficient amount of the measured air pressure of the tire from the normal air pressure, by correcting to increase the normal air pressure read out from said storage means by a predetermined value, and setting the corrected normal air pressure in said calculation means, when said expressway traveling detection means detects that the vehicle is traveling on the expressway, or detects possibility of traveling on the expressway before the beginning of actual traveling.

2. The device according to claim 1, wherein said expressway traveling detection means detects, on the basis of a communication for expressway toll collection between a communication unit mounted on the vehicle and a unit equipped on the road side, if the vehicle is traveling on the expressway.

3. The device according to claim 1, wherein said expressway traveling detection means comprises navigation means which includes current position detection means for detecting a current position of the vehicle, and travel route setting means for setting a travel route of the vehicle to a destination, and said expressway traveling detection means detects that the vehicle is traveling on the expressway or predicts that the vehicle will travel on the expressway, when the current position of the vehicle detected by said current position detection means indicates that the vehicle is present on the expressway, or when the travel route set by said travel route setting means includes the expressway.

4. The device according to claim 3, wherein said navigation means includes display means for displaying the current position of the vehicle detected by said current position detection means and the travel route to the destination set by said travel route setting means together with a map image, and when said calculation means calculates the excessive/deficient amount of the tire air pressure, said informing control means controls said navigation means to display information associated with a facility where the tire air pressure can be adjusted on a travel route from the current position of the vehicle to an approach ramp of the expressway.

5. The device according to claim 4, wherein when said display means displays the information associated with the facility where the tire air pressure can be adjusted, said navigation means can guide the travel route to the destination by way of that facility.

6. The device according to claim 3, wherein when said calculation means calculates the excessive/deficient amount of the tire air pressure, said navigation means can guide a travel route that excludes the expressway detected by said expressway traveling detection means as the travel route from the current position of the vehicle to the destination.

7. An air pressure warning device of a vehicle tire, which comprises a tire air pressure sensor, attached to a vehicle tire, for detecting a tire air pressure, and an informing unit for informing a tire air pressure state on the basis of the tire air pressure detected by the tire air pressure sensor, comprising:

a storage module for storing a normal air pressure of the tire;

a calculation module for calculating an excessive/deficient amount of a measured air pressure of the tire from the normal air pressure on the basis of a relationship between the normal air pressure stored in said storage module and the air pressure detected by the tire air pressure sensor;

an expressway traveling detection module for detecting if the vehicle is traveling on an expressway or if the vehicle will travel on the expressway before the beginning of actual traveling; and an informing control module for controlling the informing unit to inform the excessive/deficient amount calculated by said calculation module as an air pressure state of the tire, wherein said informing control module controls the informing unit to inform a deficient amount larger than an actual amount upon informing the deficient amount of the measured air pressure of the tire from the normal air pressure, by correcting to increase the normal air pressure read out from said storage module by a predetermined value, and setting the corrected normal air pressure in said calculation module, when said expressway traveling detection module detects that the vehicle is traveling on the expressway, or detects possibility of traveling on the expressway before the beginning of actual traveling.

8. The device according to claim 7, wherein said expressway traveling detection module detects, on the basis of a communication for expressway toll collection between a communication unit mounted on the vehicle and a unit equipped on the road side, if the vehicle is traveling on the expressway.

9. The device according to claim 7, wherein said expressway traveling detection module comprises a navigation unit which includes a current position detection module for detecting a current position of the vehicle, and a travel route setting module for setting a travel route of the vehicle to a destination, and said expressway traveling detection module detects that the vehicle is traveling on the expressway or predicts that the vehicle will travel on the expressway, when the current position of the vehicle detected by said current position detection module indicates that the vehicle is present on the expressway, or when the travel route set by said travel route setting module includes the expressway.

10. The device according to claim 9, wherein said navigation unit includes a display device for displaying the current position of the vehicle detected by said current position detection module and the travel route to the destination set by said travel route setting module together with a map image, and when said calculation module calculates the excessive/deficient amount of the tire air pressure, said informing control module controls said navigation unit to display information associated with a facility where the tire air pressure can be adjusted on a travel route from the current position of the vehicle to an approach ramp of the expressway.

11. The device according to claim 10, wherein when said display device displays the information associated with the facility where the tire air pressure can be adjusted, said navigation unit can guide the travel route to the destination by way of that facility.

12. The device according to claim 9, wherein when said calculation module calculates the excessive/deficient amount of the tire air pressure, said navigation unit can guide a travel route that excludes the expressway detected by said expressway traveling detection module as the travel route from the current position of the vehicle to the destination.

* * * * *

UNITED STATES PATENT AND TRADEMARK OFFICE
CERTIFICATE OF CORRECTION

PATENT NO. : 6,622,553 B2
DATED : September 23, 2003
INVENTOR(S) : Toshio Hayashi et al.

It is certified that error appears in the above-identified patent and that said Letters Patent is hereby corrected as shown below:

Column 5,
Line 52, change "value a" to -- value $\alpha$ --.

Column 7,
Line 38, change "value a" to -- value $\alpha$ --.

Column 8,
Line 42, change "value a" to -- value $\alpha$ --.

Signed and Sealed this

Fourth Day of May, 2004

JON W. DUDAS
*Acting Director of the United States Patent and Trademark Office*